Nov. 16, 1965  G. B. ALEXANDER ETAL  3,218,135
POWDER METAL COMPOSITIONS CONTAINING DISPERSED REFRACTORY OXIDE
Filed Jan. 31, 1962

INVENTORS
GUY B ALEXANDER
SHERWOOD F. WEST
PAUL C. YATES
BY
ATTORNEYS

United States Patent Office 3,218,135
Patented Nov. 16, 1965

3,218,135
POWDER METAL COMPOSITIONS CONTAINING DISPERSED REFRACTORY OXIDE
Guy B. Alexander, Sherwood F. West, and Paul C. Yates, Brandywine Hundred, Del., assignors to E. I. du Pont de Nemours and Company, Wilmington, Del., a corporation of Delaware
Filed Jan. 31, 1962, Ser. No. 170,093
9 Claims. (Cl. 29—182.5)

This invention relates to powder metal compositions and processes for producing them, and is more particularly directed to such powders which comprise A grains of metal in each of which is dispersed a plurality of submicron particles of a refractory metal oxide having a free energy of formation ($\Delta F$) at 1000° C. more than 60 kilocalories per gram atom of oxygen, grains A being bonded to B grains of a metal having an oxide with a $\Delta F$ at 27° C. below 105 kilocalories per gram atom of oxygen, said grains B being substantially free of dispersed particles, and is further particularly directed to processes for making such powders, the processes comprising the steps of (1) preparing a dispersion of said submicron refractory oxide particles in the metal of grains A, in powder form (2) mixing this powder with a molten compound C of the metal of grains B, said compound having a melting point below 60% of the melting point of the metal of grains A, both melting points being in degrees absolute, and the molten compound being at a temperature at least 50° C. below the sintering temperature of grains A (3) reducing compound C to the metal of grains B, the reduction being continued until the oxygen content of the product, in excess of that present in the refractory oxide particles, is less than about 0.5% by weight, and (4) sintering the product at an elevated temperature below the lower of the melting points of the metals of grains A and B until it has a surface area of less than 10 square meters per gram.

Figure 1:
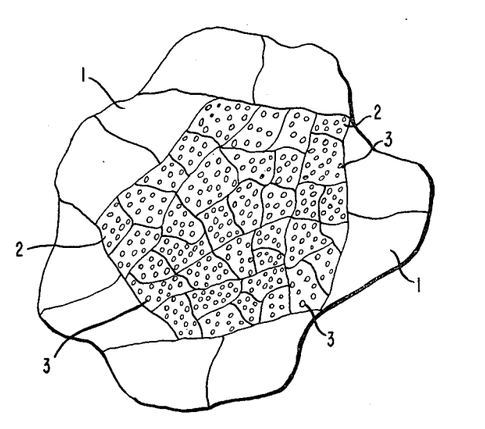
The drawing shows an artist's sketch of a powder particle of the invention illustrating grains of metal 2 in each of which there is dispersed a plurality of submicron, refractory metal oxide particles 3, there being bonded to said grains other grains of metal 1 in which there are no dispersed particles. Dimensions in the drawing are not necessarily to scale.

It has already been proposed to make powder metal compositions in which each powder particle consists either of a core of refractory material with a coating of metal or a core of metal with a coating of refractory material. The latter powders, when heated to sintering temperatures to solidify them, have the obvious disadvantage that the refractory in the coating coalesces with the refractory in the coating of adjacent particles and hence the refractory particles quickly grow and no control of the ultimate size of the particles is possible. On the other hand, the powder particles having a single refractory particle core with a metal coating suffer from the difficulty that if the core is small enough to effect dispersion hardening, known methods for depositing metal upon it do not suffice to insure complete coverage and again coalescence of the dispersoid particles becomes a problem.

It has also been proposed to prepare metal powders in each particle of which there is dispersed a plurality of refractory oxide particles. Such powders can be sintered according to powder metallurgy methods into products which have substantially increased hardness and strength, particularly at elevated temperatures, by reason of the presence of the dispersoid particles. However, especially with high-melting metals such as iron, cobalt, nickel, tungsten, molybdenum, and chromium, and their alloys, control of certain related properties such as ductility is a problem when using these uniformly dispersed dispersoid-filled powders to make solid metal products, and for maximum ease of fabrication and control of properties a practical method for diluting the powders with untreated metal was desired. It was found that by blending unfilled and filled metal powders a substantial and controlled variation of the properties of the sintered metal made therefrom could be achieved, but segregation of the powder particles into fractions of filled and unfilled metal readily occurred, with consequent lack of uniformity of the sintered metal. Also, the mixture of the filled and unfilled metal volumes was not as intimate as was desired.

Now according to the present invention it has been found that the difficulties aforementioned can be overcome and further, unobvious advantages can be achieved by providing metal powder compositions in which the filled metal and unfilled metal portions are an integral part of each powder particle. Moreover, in the present invention processes are provided for producing the novel metal powders, such processes being practicable and easy to control in such a manner as to give powders which can be sintered into solid metal products having almost any desired properties within the physical limitations of the metals themselves.

Alloying of the novel powders is much easier than when blending coarser, unfilled metal powders with filled metal powders, because the size of the unfilled metal volumes is reduced below the size available as non-pyrophoric metal powders. Furthermore, since the size is smaller the diffusion distances involved in homogenizing the metal are shorter and alloying becomes easier. Also, generally speaking, the "islands" or volumes of metal not containing dispersoid particles are smaller with sintered products made from the novel powders of this invention than is the case with the solid metals obtained by sintering the previously available blended powders; hence, the strength of the solid metal product is generally somewhat higher than when the prior art products are used.

Employing the powders of the present invention it is also easier to control the excess oxygen content of the sintered metal products, particularly in the case of chromium alloys. Unfilled chromium powder, for example, sinters badly when subjected to hydrogen for the purpose of removing the last traces of oxygen in the reductions of the prior art. For this reason oxygen-free chromium is difficult to obtain according to the prior practices and the oxygen content of most available nickel-chromium alloy powders is either too high or the particle size of the powder is too large for blending with refractory-filled powder particles to make powders suitable for sintering. With the novel powders of the present invention this difficulty is brought under control.

The invention furthermore provides a method for producing non-pyrophoric metal powders which are heavily loaded with refractory oxide particles, because the grains of metal in which no refractory oxide particles are present are disposed on the surface of the powder particles making reduction in surface area by sintering much easier to accomplish.

*Preparing the dispersion of refractory oxide in metal*

In a process of the present invention the first step is to prepare a dispersion of suitable refractory metal oxide particles in a metal. Such procedures have already been described in Alexander, Iler and West U.S. Patent 2,972,-529, issued February 21, 1961, and in Alexander, Yates and West U.S. Patent 2,949,358, issued August 16, 1960, and any of the processes therein described can be used.

The refractory oxide particles dispersed in the metal will herein sometimes be referred to as "the filler." "Filler" is not used to mean an extender or diluent; rather, it means an essential constituent of the novel compositions which contributes new and unexpected properties to the metalliferous products. The filler must have certain characteristics to give the desired effects. It must be refractory—that is, it must not melt in the molten metal to which it is ultimately added—and in general, should have a melting point above 1000° C. It should not sinter or be soluble to any substantial degree in the metal to which it is to be added. The art is familiar with refractories generally, and one skilled in the art will have no trouble recognizing a refractory answering the above description.

A relatively non-reducible oxide is selected as the filler—that is, an oxide which is not reduced to the corresponding metal by hydrogen, or by the metal in which it is embedded, at temperatures below 1000° C. Such fillers have a $\Delta F$ at 1000° C. of more than 60 kilocalories per gram atom of oxygen in the oxide. The oxide itself can be used as the starting material or it can be formed during the process by heating another metal-oxygen-containing material. The metal-oxygen-containing material can, for example, be selected from the group consisting of oxides, carbonates, oxalates, and, in general, compounds which, after heating to constant weight at 1500° C., are refractory metal oxides.

The filler can be a mixed oxide, particularly one in which each oxide conforms to the melting point and $\Delta F$ above stated. Thus, magnesium silicate, $MgSiO_3$, is a mixed oxide of $MgO$ and $SiO_2$. Each of these oxides can be used separately; also, their products of reaction with each other are useful. The filler, accordingly, is a single metal oxide or a reaction product of two or more oxides; also, two or more separate oxides can be used as the filler. The term "metal oxide filler" broadly includes spinels, such as $MgAl_2O_4$ and $ZnAl_2O_4$, metal carbonates, such as $BaCO_3$, metal aluminates, metal silicates such as magnesium silicate and zircon, metal titanates, metal vanadates, metal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Typical single oxide fillers are silica, alumina, zirconia, titania, magnesia, halfnia, and the rare earth oxides including thoria. A typical group of suitable oxides, and their free energies of formation is shown below:

| Oxide | $\Delta F$ at 1,000° C. | Oxide | $\Delta F$ at 1,000° C. |
|---|---|---|---|
| $Y_2O_3$ | 125 | $ZrO_2$ | 100 |
| $CaO$ | 122 | $BaO$ | 97 |
| $La_2O_3$ | 121 | $ZrSiO_4$ | 95 |
| $BeO$ | 120 | $TiO$ | 95 |
| $ThO_2$ | 119 | $TiO_2$ | 85 |
| $MgO$ | 112 | $SiO_2$ | 78 |
| $UO_2$ | 105 | $Ta_2O_5$ | 75 |
| $HfO_2$ | 105 | $V_2O_3$ | 74 |
| $CeO_2$ | 105 | $NbO_2$ | 70 |
| $Al_2O_3$ | 104 | $Cr_2O_3$ | 62 |

While any of the above-mentioned refractory metal oxides will have utility, there is a correlation between the $\Delta F$ of the refractory and the melting point of the metal in which it is to be used. Thus, the $\Delta F$ of the refractory preferably is at least the value calculated from the expression $50+.016M$, where $M$ is the melting point in degrees Kelvin of the metal in which it is to be used. The melting point referred to is that of the metal as it exists in the final product; thus, if the filled metal is an alloy of two or more metals, $M$ will be the melting point of the alloy. In the ultimate powder products the filled metal can have one melting point and the unfilled or ductile metal another; again, it is the melting point of the final product which is to be considered.

As the melting point of the metal increases, the $\Delta F$ of the refractory to be used also increases. For example, the $\Delta F$ of zirconia, 100, is too low to permit it to be used in tungsten metal (M.P.=3370° C.) to get products of the invention; on the other hand, the $\Delta F$ of thoria, 119, is well suited for use with molybdenum metal (M.P.=2620° C.).

The filler oxide must be in a finely divided state. The substantially discrete particles must have an average dimension in the size range below 1 micron. Preferably, the average dimension will be from 5 to 500 millimicrons, an especially preferred range being from 5 to 250 millimicrons, with a minimum of 10 millimicrons being even more preferred.

The particles should be dense and anhydrous for best results, but the over-all aggregate has the above-mentioned dimensions. Particles which are substantially spheroidal or cubical in shape are also preferred, although anisotropic particles such as fibers or platelets can be used for special effects. Anisotropic particles produce metal compositions of lower ductility.

The size of a particle is given as an average dimension. For spherical particles all three dimensions are equal and the same as the average. For anisotropic particles the size is considered to be one third of the sum of the three particle dimensions. For example, a fiber of asbestos might be 500 millimicrons long but only 10 millimicrons wide and thick. The size of this particle is $500+10+10/3$ or 173 millimicrons, and hence within the preferred limits.

Colloidal metal oxide aquasols are particularly useful as a means of providing the fillers in the desired finely divided form and hence are preferred. For example, silica aquasols such as those described in Bechtold et al. U.S. Patent 2,574,902, Alexander U.S. Patent 2,750,345, and Rule U.S. Patent 2,577,485 are suitable as starting materials. Zirconia sols are likewise useful. The art is familiar with titania sols, and such sols as described by Weiser in Inorganic Colloidal Chemistry, volume 2, "Hydrous Oxides and Hydroxides," for example, can be used. Also, the beryllia sols described on page 177 of this reference can be used. Thoria aquasols can be prepared by calcining thorium oxalate to 650° C. and dispersing the resulting colloidal thoria in dilute acids.

Although they are less preferred, aerogels and reticulated powders can also be used. For example, products described in Alexander et al. U.S. Patent 2,731,326 can be employed. In these instances it is necessary that the aggregate structures be broken down to particles in the size range specified, for example, by colloid milling an aqueous slurry to which a small amount of peptizing agent has been added.

Powders prepared by burning metal chlorides, as, for example, by burning silicon tetrachloride, titanium tetrachloride, or zirconium tetrachloride to produce a corresponding oxide, are also very useful if the oxides are obtained primarily as discrete, individual particles, or aggregated structures which can be dispersed to such particles.

Calcium oxide is a useful filler. Since this oxide is water soluble, or more accurately, water reactive, one cannot obtain it as an aqueous dispersion in the colloidal state. In this instance, one can use an insoluble calcium compound, such as the carbonate or oxalate, which, on heating, will decompose to the oxide. Thus, for example, particles of finely divided calcium carbonate can be coated with an oxide of the metal in which it is to be dispersed, e.g., hydrous iron oxide, by treating a dispersion of finely divided calcium carbonate with a base and a salt of the metal, e.g., sodium carbonate and ferric nitrate. On heating the precipitate and reducing, a dispersion of calcium oxide in iron is obtained. Similarly, one can obtain dispersions of barium oxide, strontium oxide, or magnesia in the metal being treated.

The metal in which the refractory oxide is to be incorporated is selected from the group consisting of metals having an oxide with a free energy of formation at 27° C. below 105 kilocalories per gram atom of oxygen. These metals, and the free energies of formation of certain of their oxides, are as follows:

| Metal | ΔF at 27° C. | Metal | ΔF at 27° C. | Metal | ΔF at 27° C. |
|---|---|---|---|---|---|
| Cu | 35 | Ni | 51 | Cr | 83 |
| Cd | 55 | Co | 52 | Mn | 87 |
| Tl | 40 | Fe | 59 | Nb | 90 |
| Ge | 58 | Mo | 60 | Ta | 92 |
| Sn | 60 | W | 60 | Si | 98 |
| Pb | 45 | Re | 45 | V | 99 |
| Sb | 45 | In | 65 | Ti | 103 |
| Bi | 40 | Zn | 76 | | |

Mixtures of these metals can, of course, be used.

In preparing the filled metal particles, a relatively large volume of metal oxide, hydroxide, hydrous oxide, oxycarbonate, or hydroxycarbonate, or, in general, any compound of the metal wherein the metal is in an oxidized state, is formed as a coating around a plurality of the refractory oxide filler particles. This coating can be a compound of a single metal, or it can contain two or more metals. For example, the hydrous oxides of both nickel and cobalt can be deposited around a filler. In the latter case, an alloy of nickel and cobalt is produced directly, by reducing with hydrogen.

In a similar manner, alloys of any metal which form oxides that can be reduced with hydrogen can be prepared. Thus, alloys of iron, cobalt, nickel, copper, molybdenum, tungsten, chromium and rhenium can be made by codepositing oxides of two or more of the selected metals on the filler particles and subsequently reducing these oxides.

The hydrous, oxygen-containing compound can be precipitated from a soluble salt, preferably a metal nitrate, although metal chlorides, sulfates, and acetates can be used. Ferric nitrate, cobalt nitrate, and nickel nitrate are among the preferred starting materials. The precipitation can be conveniently accomplished by adding a suitable soluble metal salt to an aqueous alkaline solution containing the filler particles, while maintaining the pH above 7. A good way to do this is to add, simultaneously but separately, a concentrated, aqueous solution of the soluble metal salt, a colloidal aquasol containing the filler particles, and an alkali such as sodium hydroxide, to a heel of water. Alternatively, a dispersion containing the filler products can be used as a heel, and the metal salt solution and alkali added simultaneously but separately thereto.

More broadly, in depositing the compound of a metal in an oxidized state upon the filler, one can react any soluble salt of these metals with a basic material. Hydroxides such as NaOH, KOH, or ammonia, or carbonates such as $(NH_4)_2CO_3$, $Na_2CO_3$ or $K_2CO_3$ can be used.

During the coating process certain precautions are preferably observed. It is preferred not to coagulate or gel the colloid. Coagulation and gelation are avoided by simultaneously adding the filler and the metal salt solution to a heel. The filler particles should be completely surrounded with the reducible oxides or hydrous oxides such as those of iron, cobalt or nickel, so that when reduction occurs later in the process, aggregation and coalescence of the filler particles is avoided—that is, the ultimate particles of the filler should not be in contact, one with another, in the coprecipitated product. This condition is insured by using vigorous mixing and agitation.

Having deposited the hydrous oxygen compound of the metal, such as iron, cobalt or nickel, on the filler, it is then desirable to wash out the salts formed during the reaction. Ordinarily, one uses an alkali such as sodium hydroxide, potassium hydroxide, lithium hydroxide, ammonium or tetramethylammonium hydroxide in the deposition of the compound, and salts like sodium nitrate, ammonium nitrate or potassium nitrate are formed metathetically. These should be removed. One of the advantages of using the nitrate salts in combination with aqueous ammonia is that ammonium nitrate is volatile and therefore is easily removed from the product. However, the tendency of many metals, such as cobalt and nickel, particularly, to form amine complexes, is a complicating reaction in this case. By carefully controlling the pH during coprecipitation, the effect of these side reactions can be minimized.

Having essentially removed any soluble, non-volatile salts by washing, the product is then dried at a temperature above 100° C. Alternatively, the product can be dried, and the dry material suspended in water to remove the soluble salts, and thereafter the product redried.

The relative amount of oxidized metal compound coating which is deposited on the filler particles depends somewhat on the end use to which the product is to be put, but is generally in the range from 1 to 35% by volume and preferably from 5 to 20%. At loadings below 1% the filled metal is too soft, and at very high loadings the powders are difficult to work with because there is insufficient metal phase to hold the aggregate structure together.

Volume loadings as high as 50%—that is, one volume of oxide for each volume of metal present—can be successfully used, but such products are often pyrophoric. Even heating to a temperature approaching the melting point of the metal after reduction does not completely eliminate this problem. Also, the filler particles in such products tend to coalesce to form large, hard aggregates during the reduction step. This tendency can be reduced by increasing the particle size of the filler, say, to 100 millimicrons or even larger. These problems are minimized as the volume loading is reduced. In the range of 40 to 50 volume percent of filler, it is advisable to protect the modified metal in an inert atmosphere (hydrogen, argon or nitrogen) until the material is combined with unmodified metal and compacted. Even at 10 volume percent, one often has difficulty sintering the modified metal mass sufficiently that it can be handled in air.

Having deposited the compound of metal in oxidized state around the filler particles and dried the product, the coating is reduced to the metal. This can be conveniently done by subjecting the coated particles to a reducing agent, such as a stream of hydrogen at a somewhat elevated temperature. However, the temperature throughout the entire mass must not be allowed to exceed the sintering temperature of the filler particles. One way to accomplish this is to place the product in a furnace at controlled temperature, and add hydrogen gas slowly. Under these conditions the reduction reaction will not proceed so rapidly that large amounts of heat are liberated and the temperature in the furnace is increased.

Hydrogen to be used in the reduction can be diluted with an inert gas such as argon, or in some cases nitogen, to reduce the rate of reaction and avoid "hot spots." In this way the heat of reaction will be carried away in the gas stream. Alternatively, the temperature in the furnace can be slowly raised into the range of 500 to 700° C while maintaining a flow of hydrogen over the product to be reduced.

In addition, to or instead of, hydrogen, carbon monoxide, methane, or other hydrocarbon gases can be used as the reducing agent, particularly at elevated temperatures. It is important that the temperature during reduction be controlled, not only to avoid premature sintering as above mentioned, but also so that excessive reaction will not occur between the reducible compound (such as iron, cobalt or nickel oxide) and the filler oxide before the reducible compound is reduced.

Reduction should be continued until the precipitated metal compound is essentially completely reduced. When the reaction is nearing completion, it is preferred to raise the temperature to complete the reduction reaction, but care must be taken not to exceed the melting point of the reduced metal. Reduction should be carried out until the oxygen content of the mass is substantially reduced to zero, exclusive of the oxygen of the oxide filler material. In any case, the oxygen content of the filled metal, exclusive of the oxygen in the filler, should be in the range from 0 to 2%.

After reduction the resulting powder is sometimes pyrophoric. Therefore, it is preferred to cool and store the mass in an inert atmosphere such as argon.

It is desirable that the filled metal powder be stored in an inert atmosphere such as argon if its surface area is greater than 0.1 square meter per gram. The atmosphere should be essentially free of oxygen, water vapor, nitrogen, sulfur, and any other elements or compounds which are reactive with the metal powder.

An alternative way of reducing the precipitated metal compound in contact with the refractory filler, especially when the metal of the compound is an active one such as titanium or niobium, is to subject the coated particles to a metal reducing agent in a fused salt bath. The compound-coated refractory oxide particles are dispersed in the molten salt and the reducing metal is added while maintaining the temperature of the molten salt in the range of 400 to 1200° C.

The fused salt bath in this step of the process is merely a medium whereby to effect contact of the reducing agent and the metal compound under conditions which will not affect the disposition of the compound with respect to the refractory particles. It can comprise any suitable salt or mixture of salts having the necessary stability, fusion point, and the like.

Suitable fused salt baths can comprise halides of metals selected from Groups I and IIa of the Periodic Table. It will be noted that the salt selected is one which is not itself reduced by the reducing metal.

In general, the chlorides and fluorides are preferred halides. Bromides or iodides can be used, although their stability at elevated temperatures is frequently insufficient. Chlorides are especially preferred. Thus, among the preferred salts are calcium chloride, sodium chloride, potassium chloride, barium chloride, strontium chloride, and lithium chloride and the corresponding fluorides.

The fused salt bath will usually be operated under a blanket of either an inert gas or a reducing gas. Such gases as helium, argon, hydrogen or hydrocarbon gases can be used in this capacity.

The temperature of the reduction can be varied considerably, depending upon the combination of fused salt and reducing metal selected. In general, the temperature of reduction will be between 400 and 1200° C. It is usually preferred to select a reduction temperature at which the reducing metal, as well as the fused salt, is present in a molten state. Usually the operating temperature will also be below the boiling point of the reducing metal employed.

The operating temperature of the reduction bath must also be below the melting point of the metal coating to be produced on the refractory filler. For example, if a tungsten compound is being reduced upon particles of thoria, reduction temperatures as high as 1200° C. can be employed; however, if a compound of copper, or of a copper-containing alloy having a low melting point, is being reduced, the reduction temperature should be maintained below that of the melting point of the copper or the alloy.

The reducing metal is selected from the group consisting of alkali and alkaline earth metals. Thus, the metal can be lithium, sodium, potassium, rubidium, caesium, beryllium, magnesium, calcium, strontium, or barium.

It is preferred to use a reducing metal which has a low solubility in the solid state with respect to the metal of the coating on the refractory oxide particles; otherwise, one will get undesirable alloying of the reducing metal with the metal formed by the reduction. For this reason, calcium and sodium are especially suitable for reducing compounds of such metals as iron, cobalt, nickel, chromium or tungsten, while magnesium and sodium are useful in reducing titanium.

It is preferable to use a temperature of reduction at which the reduction reaction proceeds at a rapid rate. For reducing cobalt, iron and nickel compounds, temperatures in the range of 600 to 800° C. are suitable. With compounds of metals such as chromium, titanium, and niobium, temperatures in the range of 850 to 1000° C. are used.

Completion of the reduction reaction can be determined by taking samples from the melt, separating the product from the fused salt, and analyzing for oxygen by ordinary analytical procedures such as vacuum fusion. The reduction is continued until the oxygen content of the mass is substantially reduced to zero, exclusive of the oxygen of the oxide refractory material. In any case, the oxygen content of the product, exclusive of the oxygen in the refractory, should be in the range of from 0 to 2%.

The reduced product is present as a suspension in the fused salt bath. It can be separated therefrom by the techniques ordinarily used for removing suspended materials from liquids. Gravitational methods such as settling, centrifuging, decanting and the like can be used, or the product can be filtered off. Alternatively, the bath can be cooled and the fused salt dissolved in a suitable solvent such as dilute aqueous nitric acid or acetic acid.

If a considerable excess of reducing metal is used in the reduction step, it may be necessary to use a solvent less reactive than water for the isolation procedure. In such a case, methyl or ethyl alcohol is satisfactory. The presence of a small amount of acid in the isolation solvent will dissolve any insoluble oxides formed by reaction between the reducing metal and the oxygen content of the coating being reduced. After filtering off the reduced metal powder, it can be dried to free it of residual solvent.

It will be understood that irrespective of which of the above-mentioned reduction methods is used one can prepare a dried, refractory oxide-filled metal in powder form for use in the next step in the processes of the present invention.

*Mixing the oxide-filled dispersion with the molten reducible compound C*

Having prepared a refractory oxide-filled metal powder as above described, this powder is then mixed with a molten, reducible metal compound. The metal of this compound is one which has an oxide having a free energy of formation at 27° C. below 105 kilocalories per gram atom of oxygen in the oxide. A tabulation of such metals, together with the $\Delta F$ at 27° C. of their oxides, has already been given above, and it will be understood that the metal can be selected from this tabulation.

The anion of compound C can be any anion which gives a compound which is fusible within the required temperature range. Suitable anions can be selected from the group consisting of hydrated oxides, nitrates, sulfates, halides, oxy-halides, acetates, and other salts which can be reduced to metal either directly or after heating in air and conversion to the oxide. Specific compounds include $Bi(OH)_3$, $(BiNO_3)_3.5H_2O$, $BiONO_3.H_2O$
$Co(NO_3)_2.6H_2O$, $CoCl_2.6H_2O$, $Cu(C_2H_3O_2)_2.H_2O$
$Cu(NO_3)_2.3H_2O$, $CuSO_4.5H_2O$, $Cr(NO_3)_3.9H_2O$
$CrO_3$, $Fe(NO_3)_2.6H_2O$, $Fe(NO_3)_3.6H_2O$, $FeCl_3.6H_2O$
$FeBr_3.6H_2O$, $FeSO_4.7H_2O$, $MoO_3.2H_3O$, $MoCl_5$
$Ni(NO_3)_2.6H_2O$, $NiSO_4.6H_2O$, $NbCl_5$, $PbOHNO_3$
$H_2WO_4$, and $NH_4Cr(SO_4)_2.12H_2O$ Of these, the metal nitrates are preferred.

It is noted that the melting point of compound C must be below 60% of the melting point of the metal containing the dispersed refractory oxide, both melting points being expressed in degrees absolute. Thus, for a metal having a melting point of 800° C. (1073 degrees absolute) the compound selected must have a melting point below 644 degrees absolute (371° C.).

Irrespective of its melting point, the molten mass of compound C must be maintained at a temperature at least 50° C. below the sintering temperature of the refractory oxide-filled metal powder. This sintering temperature will not be the same as the sintering temperature of a powder of the metal without the refractory filler, but it can be easily determined experimentally by heating the filled powder and observing the temperature at which it sinters. Exceeding this temperature maximum in the molten compound is avoided because if sintering occurs, the desired heterogeneous character of the ultimate product will be lost.

It will be understood, of course, that the refractory oxide-filled powder need not be added to the already molten compound C but can be mixed with compound C at lower temeperature and the mixture then heated up to melt compound C so that the refractory oxide metal thereupon becomes mixed with the molten compound. This is just another manner of effecting the desired mixing.

Reducing compound C to metal

The compound C in the molten mixture just described is next reduced to the corresponding metal, as by bringing it into contact with a hydrogen-containing gas or with a reducing metal, as already described for preparation of metal grains A. If a gas is used, it can be pure hydrogen, cracked ammonia, a mixture of hydrogen and carbon monoxide such as water-gas, or a mixture of hydrogen with hydrocarbon gas; but substantially pure hydrogen is preferred. Techniques for the reduction of metal oxides to metal with hydrogen have already been described in detail and it will be understood that these techniques can be adapted to the reduction of the metal compound C.

The method of reduction selected will depend to some extent on the anion of compound C. In general, halide salts such as the chlorides—cobalt chloride, for instance —can be reduced directly, by bringing them into contact with dry hydrogen or with moist hydrogen at elevated temperatures. With other anions such as the nitrates—nickel nitrate, for instance—the compound can be heated at an elevated temperature sufficient to decompose the nitrate to the oxide and the oxide can then be reduced with hydrogen. If compound C is already in the form of the oxide, it is sometimes sufficient simply to dehydrate it and then heat it in contact with dry hydrogen. Very dry hydrogen is required for the reduction of some compounds, like $Cr_2O_3$.

Whatever the method selected for reduction, the reduction should be continued until the free oxygen of the product, in excess of that combined as the submicron particles of dispersed refractory metal oxide from the first step of the process, is less than 0.5% by weight, preferably less than 0.1%, and most preferably in the range of 0 to .05% by weight.

Sintering the reduced product

Following the reduction, the product may have a sufficiently high surface area to be pyrophoric or at least to have an undesirably high rate of oxidation. Accordingly, the product is heated at the sintering temperature for a time sufficient to lower the surface area of the metal powder to less than 10 square meters per gram, preferably less than 1 square meter per gram. In carrying out this sintering care should be used to keep the temperature below the melting point of the metals present.

The novel compositions

The novel powder products of this invention are dispersions of submicron refractory filler oxide particles in a metal matrix, said dispersion being heterogeneous in that in a single powder particle there are volumes of metal containing filler and other volumes of metal substantially free of filler. When the metal powder is annealed at a temperature of from 75 to 80% of its melting point in degrees absolute for about ten hours, the grain size in the resulting metal shows an unusual pattern—namely, the grains in the volumes containing filler are less than 5 microns in size while the grains in the volumes containing no filler are greater than 10 microns in size.

On the other hand, the powder compositions are uniform in that the powder cannot be separated by ordinary fractionization methods, such as sieving or settling techniques, into components having grossly different filler contents. This uniformity is further evidenced by the fact that the powder particles have a relatively constant oxygen content from one particle to another.

The size of the powder particles can vary considerably, depending upon the extent to which sintering has taken place. In the powders which are to be fabricated into solid metal products by powder metallurgy it is preferred that the particle size be in the range of from 10 to 100 microns, or more broadly, that the powder pass substantially completely through a 60-mesh sieve.

The surface area of the powders will, of course, depend on the particle size and also on the porosity of the powders. In any event the surface area of the powders should be less than 10 square meters per gram to avoid pyrophoricity or an unduly high rate of oxidation.

In the powder products there are grains A of metal in each of which there is dispersed a plurality of the submicron particles of refractory metal oxide and these grains are bonded to grains B of the metal formed by the reduction of molten compound C, the latter grains being substantially free of dispersed particles. It will be understood that these two types of grains are bonded in the same manner as are the grains in any solid metal or alloy and their disposition relative to one another can be demonstrated by conventional metallographic techniques.

The filler particles present in the filled metal grains are dispersed throughout said grains. This dispersion can be demonstrated using the electron microscope and replica techniques wherein the surface of a metal piece is polished, a carbon layer is deposited on the polished surface, and the metal is removed, as by dissolving in acid. An electron micrograph of the remaining carbon film shows how the filler particles are distributed within the metal grains.

The filler particles in the powder products are in the size range of 5 to 1000 millimicrons, preferably from 5 to 500 millimicrons, and still more preferably from 10 to 250 millimicrons. The latter class is particularly preferred, since the 10 millimicron particles are considerably more resistant to coagulation or gelling during processing than are smaller particles, and thus are easier to maintain in a dispersed state than are smaller particles. Products containing filler particles in the size range of from 10 to 250 millimicrons can be readily produced from colloidal dispersions.

In describing the powder products an oxide filler particle is considered to be a single coherent mass of oxide surrounded by metal and separated from other oxide mass by metal. The particles may be aggregates of smaller ultimate units which are joined together to form a structure, but, of course, the size of the aggregate must be in the range of 5 to 1000 millimicrons.

The particles of the filler in the filled-metal component are substantially completely surrounded by a metal coating which maintains them separate and discrete. The particles are isolated, and do not come in contact one with another; thus, coalescence and sintering of the filler material is prevented. In other words, the filled-metal component comprises a continuous phase of metal containing, dispersed therein, the refractory filler particles.

As already indicated above there is a correlation between the refractoriness of the filler particles and the extent of improvement in the high-temperature properties of metals in which such fillers are incorporated. For instance, metal compositions in which the filler is thoria, a rare earth oxide, or a mixture of oxides of the rare earth elements of the lanthanum and actinium series, magnesium oxide, or, to a lesser extent, calcium silicate, have exceptional stability in elevated-temperature, long-continued tests such as stress rupture and creep tests. These materials maintain their properties to a considerably greater extent than metals filled with silica, for example, even when the initial hardness obtained is similar. The reason for this improvement is related to the free energy of formation of the filler. For this reason, preferred compositions of the invention for use at very high temperatures, i.e., above 800 to 1000° C., comprise as the metal grains A a dispersion, in a metal, of oxide particles having a free energy of formation as determined at 1000° C. per gram atom of oxygen in the oxide, of from 90 to 123 kilocalories and preferably from 115 to 123 kilocalories.

Actually, silica is a highly efficient filler for metal compositions which do not need to be heated above 600 to 700° during processing or use. In the case of iron-molybdenum or nickel-molybdenum alloys, which are made by blending molybdenum powder with powders of modified iron or modified nickel, temperatures as high as 1300° C. or slightly higher are often encountered during processing. In these cases, only the very stable oxides are preferred as fillers, i.e., those with a very high free energy or formation, such as the rare earth oxides or calcia.

This correlation between high-temperature service and the free energy of formation of the refractory filler can be generalized in terms of the melting point of the metal or alloy A involved, since for high-temperature service metals A of high melting point are used. Thus, it is preferred that the free energy of formation of the particulate refractory (as measured at 1000° C.) be at least $52 + .016M$, where M is the melting point in degrees Kelvin of the metal or alloy phase of the solid product.

Products of the invention can be further characterized by the distance between the filler particles in those metal volumes in which such particles are present. This distance is a variable which depends on both volume loading and particle size. If the dispersed phase is a material of uniform particle size and is dispersed homogeneously in a cubic packing pattern, the following expression relates the inter-particle distance, i.e., the edge-to-edge distance Y to the particle diameter $d$ and the volume fraction of the dispersed phase $f$:

$$Y = d\left[\left(\frac{1}{1.91f}\right)^{1/3} - 1\right]$$

For products of this invention the inter-particle distance as calculated by this expression is less than 1.0 micron and preferably from 0.01 to 0.5 micron (10 to 500 millimicrons). In the most preferred products this range is 50 to 250 millimicrons, in those metal volumes in which such filler is present.

Utility of the powders

The novel powders of the present invention can be compacted and sintered to useful shapes and objects by conventional powder metallurgy techniques. In particular, the powders in which the dispersed refractory oxide particles have relatively high free energies of formation, in the range above 103 kilocalories per gram atom of oxygen, and the grains A and B are metals selected from the group consisting of iron, cobalt, nickel, chromium, tungsten, and molybdenum, and alloys of these metals, are particularly useful for fabrication into components requiring great strength at high temperatures, such as gas turbine blades. Those skilled in the art will readily understand the utility of such metal products having increased tensile strength and creep resistance at elevated temperatures and increased hardness, and yet which are sufficiently ductile that they are workable by common metallurgical processes.

Because of the presence of the unfilled metal in the powders, the powders are easily sintered, so that they can be handled in air without reoxidation, whereas powders having up to 50 volume percent of oxide filler uniformly dispersed in the metal are not readily sintered, and hence are often pyrophoric.

EXAMPLES

The invention will be better understood by reference to the following illustrative examples.

Example 1

This example describes a nickel composition containing 10 percent thoria by volume dispersed therein, the thoria being in the form of colloidal particles. The process consists of coating a thoria concentrate in nickel with molten nickelous nitrate, heating to decompose the nitrate, reducing the nickel oxide formed with hydrogen, and densifying the powder so produced.

A thoria concentrate in nickel was prepared as follows: A deposit of nickel hydroxycarbonate was formed on a colloidal thoria filler in a reactor consisting of a stainless steel tank with a conical bottom. The bottom of the tank was attached to stainless steel piping, to which were attached three inlet pipes through T's, this circulating line then passed through a return line to the tank. Initially, the tank was charged with 5 liters of water. Equal volumes of three solutions containing the desired quantities of reagents were then added into the middle of the flowing stream through the T tubes. These solutions were added at uniform, equivalent rates over a period of about one hour. Through the first T was added a solution of nickelous nitrate prepared by dissolving 3490 grams $Ni(NO_3)_2 \cdot 6H_2O$ in water and diluting to 5 liters. Through the second T was added 5 liters of thoria sol made by diluting 598 grams of 23.5% $ThO_2$ aquasol with water, and through the third, 5 liters of a 3.5 molar $(NH_4)_2CO_3$ solution. The thoria aquasol was prepared by dispersing calcined $Th(C_2O_4)_2$ in water containing a trace of nitric acid. The diluted thoria sol was highly fluid and contained particles in the 5 to 10 millimicron size range.

The solutions were added into the reactor simultaneously while the pump was in operation. The rate of addition was controlled uniformly by flow meters. The pH of the solution in the tank was taken at frequent time intervals to insure proper operating, the pH remaining essentially constant during the run and the final pH being 7.0. The slurry was circulated for a few minutes after the addition of the reagents had been completed, and then the solution was pumped into a filter. The precipitate was filtered, washed with water, and dried at a temperature of about 300° C. for twenty-four hours.

The dried product was then pulverized by grinding in a hammer mill, and screened to pass 325 mesh.

The pulverized material was placed in a furnace at a temperature of about 100° C. and a mixture of argon and hydrogen was slowly passed over it. This gas stream had previously been carefully freed of oxygen, nitrogen, and moisture. The temperature in the furnace was slowly raised over a period of an hour. The flow of hydrogen was then gradually increased, and the temperature in the furnace was gradually raised until 600° C. was reached, whereupon a large excess of hydrogen was passed over the sample in order to complete the reduction. In this way, the sample was completely reduced prior to sintering. This was important, since otherwise oxygen in the form of nickel oxide might have been trapped inside the sintered mass and complete reduction would have been extremely difficult to achieve.

Finally, the temperature was raised to 1050° C., while continuing to pass hydrogen over the sample. In this way, a nickel powder was produced containing 15 volume percent thoria, having a surface area less than 10 square meters per gram, and being essentially oxygen-free, i.e., having an oxygen content, exclusive of the $ThO_2$ filler, of less than 0.05%.

One part of the thoria-nickel powder was then slurried with 2.5 parts of molten $Ni(NO_3)_2.6H_2O$ at a temperature of 72° C. with rapid mechanical agitation. The temperature of the mixture was gradually increased to 125 to 150° C., while maintaining continuous stirring until all water and oxides of nitrogen were driven off. At this point, a solidified mass of nickel oxide-coated particles of thoria-nickel was obtained.

The product obtained was placed in a furnace and a mixture of argon and hydrogen was slowly passed over it. The gas stream had previously been carefully freed of oxygen, nitrogen, and moisture. The temperature in the furnace was slowly raised over a period of one hour. The flow of hydrogen was then gradually increased, and the temperature in the furnace was gradually raised until 600° C. was reached, whereupon a large excess of hydrogen was passed over the sample in order to complete the reduction. Thereafter, the temperature was finally raised to 1050° C. under a greatly increased flow of hydrogen in order to eliminate the last traces of oxygen from the sample and to sinter the reduced powder. In this way, a nickel powder was produced containing 10 volume percent thoria, having a surface area less than 5 square meters per gram, and being essentially oxygen-free, i.e., having an oxygen content, exclusive of $ThO_2$ filler, of less than 0.05%.

The thoria-nickel powder was then pressed hydraulically at 30 tons per square inch to a billet 1 inch in diameter and 2 inches long. The billet was next sintered in hydrogen (dew point −50° C.) for eight hours at 1200° C., the temperature being raised to the maximum over a six-hour period.

The sintered billet was then heated to 2200° F., dropped into a container at 1100° F., and then extruded through a die having a 90-degree throat, to a one-fourth-inch rod. The rod was tested as follows: Ultimate tensile strength at 1800° F. was 17,000 p.s.i. and 0.2% offset yield strength was 16,000 p.s.i. The elongation was 6%. A control sample of nickel prepared in the same way, but without benefit of the filler, had a yield strength of 1,400 p.s.i. at the same temperature. The improvement in yield strength at 1800° F. is thus a factor of eleven-fold for the thoria-filled nickel over the control sample.

An electron micrograph picture was prepared to show the distribution of thoria in the thoria-nickel sample. The micrograph showed that there were regions in which there was a homogeneous distribution of thoria in the nickel. There were also regions in which no thoria was seen. These areas correspond to the unmodified nickel which was used to blend with the thoria-nickel. Ductility and machineability are better for samples having such regions or islands of unmodified metal.

The electron micrographs were prepared as follows: A one-fourth-inch rod of nickel containing dispersed thoria was cut and the cross section was mounted in Bakelite and mechanically polished. The polished surface was cleaned and dried in ethyl alcohol. The samples were removed from the Bakelite and placed in a high vacuum furnace and a vacuum of $10^{-5}$ millimeters of Hg at 1000° C. was reached. After thermal etching for about three hours, the sample was removed and placed in a vacuum evaporator. Two carbon rods were brought together within the evaporator and current applied until sputtering occurred. A very thin film of carbon was deposited upon the etched surface as the sputtering occurred.

The carbon-covered surface was scribed into one-sixteenth-inch square with a sharp cutting blade.

Next the sample was placed in a culture dish containing a 1% solution of bromine. The carbon squares were freed from the surface of the metal by chemical attack. They floated to the surface of the solution, were picked up on electron microscope screens (250-mesh S/S wire), and viewed in a Philips EM100 three-phase electron microscope. Alternatively samples can be chemically etched, or viewed as polished.

The solution of bromine was used to remove the carbon because it would attack the base metal and not do damage to the oxide or the carbon replica.

All samples were photographed in the electron microscope at a film magnification of 1,250× and 5,000×, respectively. Prints at 5,000× were made from the 1,250× negative and at 20,000× from the 5,000× negative.

The presence of grain boundaries (lines) in the 20,000× picture was plainly observable. In the areas where filler particles were present, these grains averaged about 2 microns in size. The $ThO_2$ particles were about 0.1 micron in size. In the areas where there was no filler, the grain size was in the range of 50 microns, and greater, or about twenty-five-fold that of the filled grains.

Grain size of the nickel in the volumes containing the filler was estimated by calculation to be 1.3 microns. Thus, the estimated and observed grain sizes agree with each other.

It is preferred to sinter the compacted billet in a reducing atmosphere (such as hydrogen) rather than an inert atmosphere (such as argon), and to extrude at as low a temperature as possible. Extrusions have been made by heating the billet to 1800° F.

*Example 2*

This example describes the preparation of an improved nickel-chromium alloy having outstanding strength and oxidation resistance at high temperatures. The composition contains nickel and chromium in the ratio of 80:20 by weight and 18 volume percent of colloidal dispersed thoria. The product was prepared by coating a thoria concentrate in nickel-chromium with molten nickelous and chromium nitrates, heating to decompose the nitrates, reducing the nickel and chromium oxides formed with hydrogen, and densifying the powder so produced.

A thoria concentrate in nickel-chromium was prepared in the apparatus described in Example 1, by first depositing a coating of nickel and chromium hydroxycarbonates on a colloidal thoria filler. A solution of nickel and chromium nitrates was prepared by dissolving 1410 grams $Ni(NO_3)_2.6H_2O$ and 547 grams $Cr(NO_3)_3.9H_2O$ in water and diluting this to 5 liters. A thoria sol was prepared by dispersing calcined $Th(C_2O_4)_2$ in water containing a trace of nitric acid. The thoria in this sol consisted of substantially discrete particles having an average diameter of 5 to 10 millimicrons. A 789-gram portion of this colloidal aquasol (22.2% $ThO_2$) was used as the source of the filler material and was diluted to 5 liters. To a heel containing 5 liters of water at room temperature, the solution of nickel and chromium nitrates, the diluted thoria sol, and ammonium hydroxide-ammonium carbonate solution were added as separate solutions simultaneously, and at uniform rates, while maintaining very vigorous agitation. During the precipitation, the pH in the reactor was maintained at 7.1. A coating of nickel and chromium hydroxycarbonates was thus deposited around the thoria particles. The resulting mixture was filtered, and washed to remove the ammonium nitrate. The filter cake was dried in an oven at 300° C.

The product obtained was pulverized in a hammer mill to pass 100 mesh, placed in a furnace and heated in a stream of pure, dry hydrogen. The first stage of the reduction was completed after heating to 700° C. in a flow of hydrogen sufficient to reduce the nickel oxide in a period of four hours. In this manner nickel metal containing $ThO_2$ particles immediately mixed with $Cr_2O_3$ was produced. The temperature was then raised to 1100° C., and the $Cr_2O_3$ converted to Cr. Passage of pure, dry hydrogen was continued over the sample at 1100° C. until the dew point of the effluent hydrogen was −50° C. When completely reduced, the product consisted of a nickel-chromium alloy containing colloidally dispersed $ThO_2$ particles at a 30% volume loading.

One part of the thoria-metal powder was then slurried with 2.65 parts of molten $Ni(NO_3)_2 \cdot 6H_2O$ and 1.03 parts of molten $Cr(NO_3)_3 \cdot 9H_2O$ at a temperature of 82° C. with rapid mechanical agitation. The temperature of the mixture was gradually increased to 125 to 150° C. while maintaining continuous stirring until all water and oxides of nitrogen were driven off. At this point the mass solidified. It consisted of a nickel oxide-chromium oxide-coated thoria-nickel-chromium.

The product obtained was placed in a furnace and heated in a stream of pure, dry hydrogen. The reduction of the nickel oxide-chromium oxide-coated thoria-nickel-chromium was then conducted in two stages, as was the thoria-metal concentrate. After reducing first at 700° C. and finally at 1100° C. to a dew point, in the hydrogen, of −50° C., the product consisted of a nickel-chromium alloy containing 18 volume percent of colloidally dispersed $ThO_2$. Oxygen analysis of the final mixture showed that there was less than 0.05% oxygen present in excess of the oxygen in the $ThO_2$.

The thoria-metal powder was compacted hydraulically at 30 tons per square inch to a one-inch-diameter billet two inches in length. The billet was sintered in hydrogen (dew point −50° C.) for eight hours at 1200° C.

The sintered billet was then heated to 2400° F., dropped into a container heated at 1100° F., and then extruded through a die having a 90-degree throat, to a one-quarter-inch rod. The rod was tested as follows: Ultimate tensile strength at 1800° F. was 26,400 p.s.i and 0.2% offset yield strength was 25,500 p.s.i. The elongation was 15%. A nickel-chromium control prepared in the same way, but containing no filter, had a yield strength of 7,000 p.s.i.

The thoria-metal product had improved oxidation resistance, as well as outstanding strength at elevated temperatures and was suitable for use in high-stress-applications in oxidative and corrosive atmospheres. The material was also ideally suitable for use as a heater element material over the temperature range of 815 to 1300° C.

*Example 3*

In this example, an improved alloy was prepared by coating a thoria concentrate in nickel with molten nitrates of nickel and chromium, heating to decompose the nitrates, reducing the oxides of nickel and chromium with hydrogen, and densifying the resulting powder. The final composition contained nickel and chromium in the ratio of 80:20 by weight and 15 volume percent of colloidally dispersed thoria.

A thoria concentrate in nickel was prepared as in Example 1. A solution of nickelous nitrate was prepared by dissolving 3490 grams $Ni(NO_3)_2 \cdot 6H_2O$ in water and diluting this to 5 liters. Five liters of thoria sol was made by diluting 1640 grams of 20.9% $ThO_2$ aquasol with water. Thoria aqua sol was highly fluid and contained particles in the 5 to 10 millimicron size range. These solutions, along with a solution of ammonium hydroxide-ammonium carbonate, were fed simultaneously and at uniform rates to a heel containing 5 liters of water. The pH was maintained at 7.1 during the precipitation, while maintaining very vigorous agitation. The coprecipitate was then filtered, dried at 300° C. and pulverized to −100 mesh in a hammer mill. This nickel oxide-thoria product was then subjected to careful reduction in purified, dry hydrogen, as in Example 1. After reduction at 600° C., the thoria-nickel concentrate was further reduced and sintered at 1100° C., yielding a nickel product containing 30% by volume of colloidally dispersed thoria.

One part of this thoria-nickel product was then coated with nitrates of nickel and chromium by slurrying with 6.4 parts of $Ni(NO_3)_2 \cdot 6H_2O$ and 3.8 parts of $Cr(NO_3)_3 \cdot 9H_2O$. The temperature of the melt was 52° C. initially. While maintaining rapid mechanical stirring, the temperature of the slurry was gradually increased to 125 to 150° C. until the nitrates were decomposed and all water was eliminated. The solidified mass then consisted of a nickel oxide-chromium oxide-coated thoria-nickel.

This metal oxide-chromium oxide-coated thoria-nickel products was then reduced in two stages. The first stage of the reduction was carried out at 700° C. in a stream of pure, dry hydrogen (dew point −50° C). At this point, the partially reduced product consisted of nickel metal containing thoria particles intimately mixed with $Cr_2O_3$. The temperature of the furnace was gradually increased to 1100° C. as the flow of hydrogen was greatly increased. The reduction was continued until the dew point of the effluent hydrogen reached −50° C., at which point all $Cr_2O_3$ had been converted to Cr.

The final powder product had a surface area of less than 5 square meters per gram and was 10% by volume dispersion of colloidal thoria in an alloy, Ni:Cr ratio of 80:20 by weight. Oxygen analysis of this product showed that there was less than 0.05% oxygen present in excess of the oxygen in the $ThO_2$.

The thoria-metal product was next compacted hydraulically at 30 tons per square inch to an one-inch-diameter billet two inches long. The billet was sintered in hydrogen (dew point −50° C.) for eight hours at 1200° C.

The sintered billet was heated to 2400° F., rapidly transferred to a container heated at 1100° F., and then extruded through a die having a 90-degree throat, to a one-fourth-inch rod. The rod had a measured tensile strength at 1800° F. of 17,100 p.s.i., at 0.2% offset yield strength of 15,500 p.s.i. and an elongation of 15%.

*Example 4*

This example describes the preparation of a cobalt-chromium alloy, ratio of Co:Cr of 80:20 by weight, containing 5% by volume of colloidally dispersed $ThO_2$.

A thoria concentrate in cobalt was prepared by the procedures outlined in Example 1, except for the following: The feed solutions consisted of: (a) 4370 grams $Co(NO_3)_2 \cdot 6H_2O$ in 5 liters of $H_2O$, (b) 532 grams of $ThO_2$ aquasol containing 20.7% solids diluted to 5 liters with $H_2O$, and (c) a 3.5-molar solution of $(NH_4)_2CO_3$ solution. Reduction was carried out at 500 to 600° C. and sintering in hydrogen for one hour at 1000° C. The reduced product contained 10% by volume of colloidally dispersed $ThO_2$.

One part of the thoria-cobalt was coated with molten nitrates of cobalt and chromium by slurrying the reduced Co-$ThO_2$ with 2.0 parts of $Co(NO_3)_2 \cdot 6H_2O$ and 2.5 parts of $Cr(NO_3)_3 \cdot 9H_2O$ at a temperature of 65° C. While maintaining vigorous stirring, the slurry was gradually heated to 125 to 150° C. until the nitrates of cobalt and chromium where decomposed and all water was eliminated. The residue consisted of thoria-cobalt coated with cobalt oxide-chromium oxide.

This product was then reduced with hydrogen in stages as were the chromium-containing compositions of Examples 2 and 3. The first stage of the reduction at 700° C. reduced the cobalt oxide to give a Co metal containing thoria particles intimately mixed with $Cr_2O_3$. The final phase of the reduction was completed at 1100° C. when the dew point of the effluent hydrogen reached −50° C.

The powder product contained less than 0.05% oxygen in excess of oxygen in the $ThO_2$ as determined by oxygen analysis. The volume percentage of $ThO_2$ was 5%.

The powder was compacted and sintered according to procedures outlined in Example 1. After extrusion at 2200° F., the product was useful as a high-temperature material of construction, because of its improved creep resistance.

*Example 5*

This example describes the preparation of a nickel composition containing 10% by volume of alumina, the $Al_2O_3$ being in the form of colloidal particles. A nickel-$Al_2O_3$ concentrate was prepared according to the procedures of Example 1, except for: The feed solutions consisted of the following: (a) 3495 grams $$Ni(NO_3)_2 \cdot 6H_2O$$

in 4 liters of $H_2O$, (b) 119 grams of commercially available alumina, $Al_2O_3$, peptized in 4 liters of $H_2O$ containing 11.9 grams sodium silicate, 40° Bé and (c) a 3.5-molar solution of $(NH_4)_2CO_3$. The alumina suspension was very fluid and contained particles in the 20 to 40 millimicron size range. Reduction was carried out at 500 to 600° C. and sintering in hydrogen for one hour at 1050° C. The reduced product contained 20% by volume of colloidally dispersed $Al_2O_3$.

One part of the alumina-nickel was coated with nickelous nitrate by slurrying with 5 parts of molten $$Ni(NO_3)_2 \cdot 6H_2O$$

at a temperature of 68° C. The nickelous nitrate hexahydrate was then decomposed to nickel oxide by further heating to 125 to 150° C., as described in Example 1. The nickel oxide-coated nickel-alumina was then hydrogen reduced at 600 to 700° C. and sintered in hydrogen for one hour at 1000° C. The resulting product was a nickel powder containing 10% by volume of colloidally dispersed $Al_2O_3$ containing less than 0.05% excess oxygen.

The powder product was compacted, then sintered at 980° C for eight hours, according to procedures outlined in Example 1. After extrusion at 1800° F., the product was useful as a high-temperature alloy because of its improved creep resistance.

*Example 6*

In this example, a nickel composition reinforced with 15% by volume of colloidal zirconia is prepared according to procedures outlined in Example 1. The feed solutions used in the coprecipitation are as follows: (a) 3495 grams $Ni(NO_3)_2 \cdot 6H_2O$ dissolved in 4 liters of $H_2O$, (b) 737 grams of a commercially available zirconia aquasol containing 25.3% solids diluted to 4 liters with $H_2O$, (c) a 3.5-molar solution of $(NH_4)_2CO_3$. The zirconia aquasol used contains particles in the 10 to 20 millimicron size range. Reduction is effected at 500 to 600° C., and sintering in hydrogen for one hour at 1000° C. The reduced product contains 30% by volume of colloidally dispersed zirconia.

One part of the zirconia-nickel concentrate is coated with nickel oxide by slurrying with 5 parts of $$Ni(NO_3)_2 \cdot 6H_2O$$

by procedures detailed in Example 1. This product is then hydrogen reduced at 600 to 700° C. and sintered for one hour at 950° C. The power product contains 15% by volume of colloidal $ZrO_2$. Oxygen analysis indicates that there is less than 0.05% oxygen present in excess of oxygen combined as $ZrO_2$.

The zirconia-nickel powder product is then compacted hydraulically before sintering for eight hours at 980° C. as described in Example 1. After extrusion at 1800° F., the product is useful as a material of construction at elevated temperatures, because of its improved creep resistance.

*Example 7*

This example describes the preparation of a nickel composition containing 15% by volume of colloidal didymia, the didymia being in the form of rods approximately 100 to 150 millimicrons in length and 10 to 20 millimicrons in diameter.

A nickel-didymia concentrate is prepared according to the procedures of Example 1, except for the following: The feed solutions consist of: (a) 1455 grams $$Ni(NO_3)_2 \cdot 6H_2O$$

dissolved in 2 liters of water solution, (b) 1679 grams of didymia sol containing 5.70% solids diluted to 2 liters with water, (c) a 3.5-molar solution of $(NH_4)_2CO_3$. A 2-liter heel is used in the mixing tank. The didymia, which is a commonly occurring mixture of rare earth oxides, is prepared as a didymium hydroxide aquasol in the following manner: A solution of didymium chloride is mixed with an equal volume of concentrated ammonium hydroxide by rapidly pouring the two solutions together. The gelatinous didymium hydroxide produced is then washed by continuous decantation until free of ammonium chloride. When free of salt, the didymium hydroxide peptizes to discrete particles having the form of rods 100 to 500 millimicrons in length and 10 to 20 millimicrons in diameter. Reduction is carried out with hydrogen at 500 to 600° C. and sintering for one hour at 1000° C. The reduced product contains 30% by volume of colloidal didymia dispersed in nickel.

By methods of the previous examples, one part of this didymia-nickel concentrate is coated with nickel oxide by slurrying with 5 parts of molten $Ni(NO_3)_2 \cdot 6H_2O$, then is hydrogen reduced at 950° C. The resulting powder product contains 15% by volume of colloidal didymia. Oxygen analysis of this material indicates the presence of less than 0.05% oxygen in excess of oxygen present as didymium oxide.

The didymia-nickel product is compacted hydraulically, then sintered for eight hours in hydrogen at 980° C. by procedures described in Example 1. After extrusion at 1800° F., the product is useful for high-temperature service under conditions of high stress where creep resistance is needed.

*Example 8*

In this example a thoria-reinforced alloy is prepared containing the elements nickel, chromium, iron, and cobalt. The final alloy compositions contain 15% by volume of colloidal $ThO_2$ dispersed in an alloy matrix containing Fe, Ni, Co and Cr in the ratios 40:20:20:20 by weight.

A thoria concentrate in the metal matrix was prepared according to the procedures of Example 1, except that: The feed solutions consisted of: (a) 297.5 grams $$Ni(NO_3)_2 \cdot 6H_2O$$

461.5 grams $Cr(NO_3)_3 \cdot 9H_2O$, 867.5 grams $$Fe(NO_3)_3 \cdot 9H_2O$$

296.5 grams $Co(NO_3)_2 \cdot 6H_2O$ dissolved in $H_2O$ and diluted to 3 liters, (b) 694 grams $ThO_2$ sol containing 22.9% solids diluted to 3 liters with $H_2O$, (c) a 3.5-molar solution of $(NH_4)_2CO_3$. A 3-liter heel was used in the mixing tank. The filtered and dried coprecipitate was reduced with hydrogen in stages, as were the chromium-containing compositions of previous examples. Reduction was first carried out at 600° C. in order to reduce the oxides of Fe, Co, and Ni. The final stage of the reduction was completed at 1100° C. when the dew point of the effluent hydrogen reached —50° C.

The powder product contained 30% by volume of colloidal $ThO_2$ dispersed in the metal matrix.

One part of the thoria-metal concentrate was then coated with nitrates of Fe, Cr, Co, and Ni in a slurry containing 1 part of $Ni(NO_3)_2 \cdot 6H_2O$, 1 part of $$Co(NO_3)_2 \cdot 6H_2O$$

1.54 parts of $Cr(NO_3)_3 \cdot 9H_2O$ and 2.9 parts of $Fe(NO_3)_3 \cdot 9H_2O$ at 70° C. The temperature of the slurry was gradually increased to 125 to 150° C. while maintaining rapid mechanical stirring until the nitrates were decomposed to oxides and all water was eliminated. The residue consisted of a thoria-metal concentrate coated with oxides of Fe, Cr, Co, and Ni.

This product was then reduced with hydrogen in stages as was the thoria-metal concentrate. After reduction, first at 700° C. and finally at 1100° C. to a dew point of −50° C., the product consisted of 15% by volume of colloidal ThO₂ dispersed in a metal matrix. The powder product contained less than 0.05% oxygen in excess of oxygen in the ThO₂, as determined by oxygen analysis.

The powder was compacted and sintered according to procedures outlined in Example 1. After extrusion at 2350° C., the product was useful for high-temperature, high-stress application because of its improved stress rupture properties.

*Example 9*

This example describes the preparation of a thoria-reinforced metal composition containing the elements Ni, Cr, Co, and W. The final composition contains 15% by volume of colloidal ThO₂ dispersed in an alloy matrix containing Ni, Cr, Co, and W in the ratios 70:12:10:8 by weight.

A thoria concentrate in the metal matrix was prepared by procedures of Example 1, with the following modifications: The stainless steel piping at the bottom of the mixing tank was modified to include four inlet pipes through T's in order to feed four solutions to the tank simultaneously. The feed solutions consisted of (a) 1040 grams Ni(NO₃)₃.6H₂O, 277 grams Cr(NO₃)₃.9H₂O, 148 grams Co(NO₃)₂.6H₂O dissolved in H₂O and diluted to 3 liters, (b) 187.5 milliliters of 0.695-molar ammonium tungstate diluted to 3 liters with H₂O, (c) 621 grams of ThO₂ sol, 22.9% solids diluted to 3 liters with H₂O, (d) a 3.5-molar solution of (NH₄)₂CO₃. A 3-liter heel was used in the mixing tank. Reduction was carried out in stages. The first stage was completed at 700° C. in hydrogen. At this point, the partially reduced product consisted of colloidal ThO₂ dispersed in nickel, cobalt, and tungsten metal intimately mixed with Cr₂O₃. The final phase of reduction was completed at 1100° C. at a dew point of −50° C. of the effluent hydrogen.

This product consisted of 30% by volume of colloidal ThO₂ dispersed in a metal matrix.

One part of the thoria-metal concentrate was then coated with nitrates of Ni, Cr, and Co by slurrying with 3.47 parts Ni(CO₃)₂.6H₂O, 0.925 part Cr(NO₃)₃.9H₂O, 0.493 part Co(NO₃)₂.6H₂O at 75° C. The slurry temperature was then increased to 125 to 150° C., while maintaining vigorous stirring, at which point the nitrates were decomposed and all water was driven off. The product then consisted of thoria-metal coated with oxides of Ni, Co, and Cr. This material was then slurried with an equal weight of an aqueous solution containing 0.109 part of tungstic acid and evaporated to dryness. After heating to 110° C., the product consisted of thoria-metal coated with oxides of Ni, Co, Cr, and W. Reduction was carried out in stages. After hydrogen reduction at 700° C. to reduce the oxides of Ni, Cr, and W, the temperature was increased to 1100° C. and held until the dew point of the effluent hydrogen reached −50° C. At this point, the totally reduced product consisted of 15% by volume of colloidal ThO₂ dispersed in a metal matrix, the matrix containing the elements Ni, Cr, Co, and W in the ratios 70:12:10:8 by weight.

Oxygen analysis of the powder product showed that there was less than 0.05% oxygen present in excess of oxygen in the ThO₂.

The powder was compacted and sintered according to procedures outlined in Example 1. After extrusion at 2400° F., the product had improved high-temperature stress rupture properties and was useful for high-temperature service in high-stress applications.

*Example 10*

In this example, preparation of a ferrochrome alloy containing colloidally dispersed ThO₂ is described. The alloy matrix contains iron and chromium in the ratio of 73:27 by weight. The alloy contains 10% by volume of colloidally dispersed ThO₂.

A thoria concentrate in ferrochrome is prepared according to the procedures of the first example, with the following exceptions: The feed solutions consist of: (a) 1500 grams Fe(NO₃)₃.9H₂O and 588 grams $Cr(NO_3)_3 \cdot 9H_2O$ dissolved in H₂O and diluted to 3 liters, (b) 406 grams of ThO₂ sol containing 22.9 solids diluted to 3 liters with H₂O, (c) a 3.5-molar solution of (NH₄)₂CO₃. A 3-liter heel is used in the mixing tank. The first stage of the reduction is carried out at 700° C. and the final stage at 1100° C. until the dew point of the effluent hydrogen reaches −50° C.

The powder product consists of 20% by volume of colloidal ThO₂ dispersed in ferrochrome, Fe:Cr ratio of 73:27 by weight.

One part of the thoria concentrate in ferrochrome is coated with nitrates of iron and chromium by slurrying with 2.0 parts of Fe(NO₃)₃.9H₂O and 2.1 parts of $Cr(NO_3)_3 \cdot 9H_2O$ at 75° C. The temperature of the slurry is gradually increased to 125 to 150° C., while maintaining vigorous stirring until the nitrates decompose and all water is eliminated. The fusion product consists of an iron oxide-chromium oxide-coated thoria-ferrochrome. Hydrogen reduction of this material is conducted in stages as in the case of the thoria-ferrochrome concentrate. After reduction at 700° C., the partially reduced product is reduced at 1100° C. until the dew point of the effluent hydrogen reaches −50° C.

The powder product consists of an iron-chromium matrix having a Fe:Cr ratio of 73:27 by weight and containing 10% by volume of colloidally dispersed ThO₂. The product contains less than 0.05% oxygen in excess of oxygen in the ThO₂, as determined by oxygen analysis.

The powder is compacted and sintered according to procedures of Example 1. After extrusion at 2200° F., the product has improved high-temperature creep resistance, and is useful in high-temperature applications requiring good oxidation and creep resistance.

*Example 11*

This example describes the preparation of a 70:30 nickel-copper alloy containing 15% by volume of colloidally dispersed Al₂O₃. An alumina concentrate in nickel-copper is prepared according to the procedures of the first example, with the following exceptions: The feed solutions consist of the following: (a) 1740 grams $Ni(NO_3)_2 \cdot 6H_2O$ and 561 grams Cu(NO₃)₂.3H₂O dissolved in H₂O and diluted to 4 liters, (b) 93.6 grams of the same alumina as used in Example 5, peptized in 4 liters of H₂O, (c) a 3.5-molar solution of (NH₄)₂CO₃. The alumina is peptized by rapid mixing with an Eppenbach mixer, to give a sol containing particles in the 20 to 40 millimicron size range. A 4-liter heel is used in the mixing tank. Reduction is carried out at 600° C. and sintering in hydrogen is accomplished after one hour at 950° C. The powder product consists of 30% by volume of Al₂O₃ colloidally dispersed in a nickel-copper matrix having a Ni:Cu ratio of 70:30 by weight.

One part of the Al₂O₃-filled alloy is then coated with nitrates of copper and nickel by slurrying with 3.47 parts of Ni(NO₃)₂.6H₂O and 1.15 parts of Cu(NO₃)₂.3H₂O at 80° C. The temperature of the slurry is gradually raised to from 150 to 170° C., while maintaining vigorous stirring, and held until the nitrates are decomposed and all water is eliminated. At this point, the product consists of alumina-nickel-copper coated with oxides of nickel and copper. Reduction is carried out at 600° C. until the dew point of the effluent hydrogen reaches −50° C. Sintering in hydrogen is accomplished after one hour at 850° C.

The powder product consists of 15% by volume of colloidal $Al_2O_3$ dispersed in nickel-copper, the ratio of Ni:Cu being 70:30 by weight. Oxygen analysis of the powder product shows that there is less than .05% oxygen present in excess of oxygen in the $Al_2O_3$.

The powder is compacted acording to procedures outlined in Example 1, and sintered in purified hydrogen (dew point $-50°$ C.) for eight hours at 950° C. After extrusion at 1800° F., the product has improved high-temperature creep resistance.

Example 12

This example describes the preparation of a 17 volume percent dispersion of colloidal zirconia in a nickel-molybdenum alloy matrix, ratio of Ni:Mo of 85:15 by weight.

A zirconia concentrate in nickel-molybdenum is prepared according to procedures outlined in Example 1, with the reactor modified as in Example 9 to feed four solutions to the tank simultaneously. The feed solutions used in the coprecipitation are as follows: (a) 3370 grams $Ni(NO_3)_2.6H_2O$ dissolved in $H_2O$ and diluted to 5 liters, (b) 537 grams $(NH_4)_6Mo_7O_{34}.4H_2O$ dissolved in $H_2O$ and diluted to 5 liters, (c) 978 grams of the commercially available zirconia aquasol (25.3% solids) used in Example 6 diluted to 5 liters with $H_2O$, (d) a 3.5-molar solution of $(NH_4)_2CO_3$. The zirconia aquasol used is very fluid and contains particles in the 10 to 20 millimicron size range. Reduction is carried out at 500 to 600° C. and sintering in hydrogen at 1000° C. for one hour. The reduced product consists of a 30% by volume dispersion of colloidal zirconia in an alloy matrix of nickel-molybdenum, Ni:Mo ratio of 70:30 by weight.

The zirconia-filled nickel-molybdenum is then coated with nickelous nitrate by slurrying one part of the alloy with 3.95 parts of $Ni(NO_3)_2.6H_2O$ at 70° C. The slurry temperature is gradually increased to 125 to 150° C. while vigorous stirring is maintained and held until the nickelous nitrate is decomposed and all water is driven off. The product then consists of a nickel oxide-coated zirconia concentrate in nickel-molybdenum. Reduction is carried out at 500 to 600° C., then the temperature is gradually raised to 950° C. and held until the dew point of the effluent hydrogen reaches $-50°$ C.

The powder product consists of a 17 volume percent dispersion of colloidal zirconia in nickel-molybdenum, ratio of Ni:Mo of 85:15 by weight. There is less than 0.05% oxygen present in the product in excess of oxygen in the $ZrO_2$, as shown by oxygen analysis.

The powder is compacted according to procedures outlined in Example 1 and sintered in pure and dry hydrogen (dew point $-50°$ C.) for eight hours at 950° C. After extrusion at 2100° F., the product has improved stress rupture properties at elevated temperatures.

What we claim is:

1. A powder metal composition, the powder particles of which comprises A grains of metal in each of which there is dispersed a plurality of submicron particles of a refractory metal oxide having a free energy of formation at 1000° C. more than 60 kilocalories per gram atom of oxygen, said grains A being bonded to B grains of a metal having an oxide with a free energy of formation at 27° C. below 105 kilocalories per gram atom of oxygen, said grains B being substantially free of dispersed particles.

2. A composition of claim 1 in which the oxygen content, in excess of that present in the refractory metal oxide particles, is less than about 0.5% by weight.

3. A composition of claim 1 in which the surface area of the powder is less than 10 square meters per gram.

4. A composition of claim 1 in which the oxygen content, in excess of that present in the refractory metal oxide particles, is less than about 0.1% by weight.

5. A composition of claim 1 in which the surface area of the powder is less than 1 square meter per gram.

6. An annealed powder metal composition, the powder particles of which comprise A grains of metal having an average size less than 5 microns, in each of which there is dispersed a plurality of submicron particles of a refractory metal oxide having a free energy of formation at 1000° C. more than 60 kilocalories per gram atom of oxygen, said grains A being bonded to B grains of a metal having an oxide with a free energy of formation at 27° C. below 105 kilocalories per gram atom of oxygen, said grains B having an average size larger than 10 microns and being substantially free of dispersed particles 7. A powder metal composition, the powder particles of which comprise A grains of a metal selected from the group consisting of iron, cobalt, nickel, chromium, tungsten, and molybdenum, there being dispersed in each metal grain a plurality of submicron particles of a refractory metal oxide having a free energy of formation at 1000° C. more than 103 kilocalories per gram atom of oxygen, said grains A being bonded to B grains of a metal selected from the same group, said grains B being substantially free of dispersed particles.

8. A powder metal composition of claim 7 in which the metal of A is nickel, and the metal of B is chrominum.

9. A powder metal composition, the powder particles of which comprise grains of nickle metal in each grain of which there is dispersed a plurality of substantially discrete thoria particles having an average size of 5 to 250 millimicrons, the proportion of such particles being about from 5 to 20% by volume, said grains A being bonded to B grains of nickel substantially free of dispersed particles, the grain size of grains A being less than 5 microns and of grains B more than 10 microns.

References Cited by the Examiner
UNITED STATES PATENTS

| | | | |
|---|---|---|---|
| 1,883,898 | 10/1932 | Halliwell | 75—206 |
| 2,957,231 | 10/1960 | Davis et al. | 29—182.5 |
| 2,966,737 | 1/1961 | Spokes et al. | 29—182.5 |
| 2,985,532 | 5/1961 | Streicher | 75—212 |
| 2,986,465 | 5/1961 | Kuntz | 75—212 |

FOREIGN PATENTS

| | | |
|---|---|---|
| 824,091 | 11/1959 | Great Britain. |
| 824,092 | 11/1959 | Great Britain. |
| 827,016 | 7/1960 | Great Britain. |

REUBEN EPSTEIN, *Acting Primary Examiner.*

OSCAR R. VERTIZ, *Examiner.*